(12) United States Patent
Nishikawa

(10) Patent No.: US 8,620,148 B2
(45) Date of Patent: Dec. 31, 2013

(54) COMPRESSED CODED DATA PLAYBACK APPARATUS, AND DECODING/PLAYBACK METHOD OF COMPRESSED CODED DATA IN THE SAME APPARATUS

(75) Inventor: Masaru Nishikawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1605 days.

(21) Appl. No.: 12/086,246

(22) PCT Filed: Nov. 21, 2006

(86) PCT No.: PCT/JP2006/323222
§ 371 (c)(1),
(2), (4) Date: Jun. 9, 2008

(87) PCT Pub. No.: WO2007/102260
PCT Pub. Date: Sep. 13, 2007

(65) Prior Publication Data
US 2009/0142038 A1 Jun. 4, 2009

(30) Foreign Application Priority Data
Mar. 6, 2006 (JP) ................. 2006-059787

(51) Int. Cl.
*H04N 5/917* (2006.01)
*H04N 9/804* (2006.01)

(52) U.S. Cl.
CPC .................. *H04N 9/8042* (2013.01)
USPC ..................... 386/356; 375/240.27

(58) Field of Classification Search
CPC .................................... H04N 9/8042
USPC ........... 386/353–356; 704/500; 382/162, 166, 382/305; 375/240.27; 455/42, 102
See application file for complete search history.

(56) References Cited

U.S. PATENT DOCUMENTS

| | | | | |
|---|---|---|---|---|
| 5,353,132 A * | 10/1994 | Katsuma | ....................... | 358/539 |
| 6,570,926 B1 * | 5/2003 | Agrawal et al. | .......... | 375/240.27 |
| 6,862,320 B1 * | 3/2005 | Isu et al. | .................. | 375/240.27 |
| 6,965,328 B2 * | 11/2005 | Ji | .................................... | 341/50 |
| 6,977,877 B2 | 12/2005 | Mori | | |
| 7,162,416 B2 * | 1/2007 | Morton et al. | ................ | 704/201 |
| 7,167,108 B2 * | 1/2007 | Chu et al. | ........................ | 341/51 |
| 7,277,485 B1 * | 10/2007 | Puri et al. | ................. | 375/240.08 |
| 2001/0024568 A1 | 9/2001 | Mori | | |
| 2005/0197065 A1 * | 9/2005 | Tamaki et al. | .......... | H04B 1/00 |
| 2007/0081732 A1 * | 4/2007 | Makiyama et al. | ........... | 382/239 |
| 2007/0110395 A1 * | 5/2007 | Ishida et al. | ............. | H04N 7/00 |
| 2009/0290633 A1 * | 11/2009 | Oh et al. | .................. | 375/240.01 |

FOREIGN PATENT DOCUMENTS

| | | | |
|---|---|---|---|
| JP | 8-102141 | A | 4/1996 |
| JP | 2001-266488 | A | 9/2001 |
| JP | 2005-203029 | A | 7/2005 |
| JP | 2005-276349 | A | 10/2005 |
| JP | 2006-73079 | A | 3/2006 |

* cited by examiner

*Primary Examiner* — Hung Dang
*Assistant Examiner* — Mishawn Dunn
(74) *Attorney, Agent, or Firm* — Birch, Stewart, Kolasch & Birch, LLP

(57) ABSTRACT

A playback control section 5 obtains identification information (an extension) of compressed coded data recorded on a recording medium 1 or input information designating a decoding scheme from outside; tries decoding, unless the decoding performed in accordance with the identification information obtained or with the decoding scheme corresponding to the input information is carried out normally, with successively switching to other compatible decoding schemes; and performs playback based on the decoding scheme that enables normal decoding.

8 Claims, 4 Drawing Sheets

US 8,620,148 B2

COMPRESSED CODED DATA PLAYBACK APPARATUS, AND DECODING/PLAYBACK METHOD OF COMPRESSED CODED DATA IN THE SAME APPARATUS

CROSS REFERENCE TO RELATED APPLICATIONS

This nonprovisional application claims the benefit of U.S. Provisional Application No. 2006-059787 filed on Mar. 6, 2006 and of Japanese Patent Application No. JP2008-503753 filed in Japan, on Apr. 23, 2008. The entire contents of all of the above applications is hereby incorporated by reference.

TECHNICAL FIELD

The present invention particularly relates to a compressed coded data playback apparatus suitable for playing back a recording medium that records a mixture of compressed coded data with different compression encoding schemes, and to a decoding/playback method of the compressed coded data in the same apparatus.

BACKGROUND ART

A recording/playback apparatus is known which can record a data series including mixed data blocks with different compression encoding schemes integrally into a single recording medium, and is suitable for a multimedia system capable of decoding and playback (see Patent Document 1, for example).

According to the technology disclosed in Patent Document 1, it adds identification data designating a compression encoding scheme to each data block of an input data series, carries out data compression by selecting and using a compression algorithm prepared in advance in accordance with the identification information, and records the compressed data on a recording medium together with the identification data. At the time of decoding, referring to the identification data, it switches the decoding algorithm, and carries out the data playback.

Patent Document 1: Japanese Patent Laid-Open No. 8-102141/1996 (Paragraphs "0010"-"0015", and FIG. 1 and FIG. 5).

To record multimedia compressed data such as audio and video on a recording medium such as a CD (Compact Disc), DVD (Digital Versatile Disc) and HD (Hard Disc), the system requests a user to set a filename. In this case, the system provides the extension of the file name automatically which corresponds to the encoding scheme of the compressed data.

For example, a file passing through the compression encoding based on MP3 (MPEG Audio Layer-3) is provided with "MP3", and a file passing through the compression encoding based on WMA (Windows Media Audio) (Windows is a registered trademark) is provided with "WMA".

To play back the compressed coded data, the playback apparatus, referring to a file system (file management region) recorded in the recording medium, selects the decoding scheme determined by the extension of the compressed coded data, and plays back by decoding. To be concrete, an MP3 audio medium passing through the compression encoding based on MP3 is decoded in accordance with the decoding scheme of the extension "MP3" to be played back. Likewise, a WMA audio medium passing through the compression encoding based on WMA is decoded in accordance with the decoding scheme of the extension "WMA" to be played back.

Accordingly, as for a file of an MP3 audio medium, which is provided with an extension "WMA", or a file with a different extension, it cannot be played back because the decoding scheme used is different.

The present invention is implemented to solve the foregoing problem. Therefore it is an object of the present invention to provide a compressed data playback apparatus and a decoding/playback method in the same apparatus enabling playback independently of the identification information such as an extension provided to a file.

DISCLOSURE OF THE INVENTION

A compressed coded data playback apparatus in accordance with the present invention includes: an identification information acquiring section for obtaining identification information of compressed coded data recorded on a recording medium; and a playback control section for performing playback, unless decoding performed in accordance with a decoding scheme corresponding to the identification information is carried out normally, with trying decoding with successively switching to other compatible decoding schemes.

A compressed coded data playback apparatus in accordance with the present invention includes: an input information acquiring section for obtaining input information designating a decoding scheme from outside; and a playback control section for performing playback, unless decoding performed in accordance with a decoding scheme corresponding to the input information is carried out normally, with trying decoding with successively switching to other compatible decoding schemes.

A decoding/playback method of compressed coded data in a compressed coded data playback apparatus in accordance with the present invention includes in the compressed coded data playback apparatus: a step of obtaining identification information of the compressed coded data recorded on the recording medium; a step of selecting a compatible decoding scheme in accordance with the identification information obtained; a step of decoding the compressed coded data recorded on the recording medium in accordance with the decoding scheme selected; a step of making a decision as to validity of the decoding based on the decoding scheme selected, and of searching for another compatible decoding scheme unless the decoding is carried out normally; and a step of trying decoding with successively switching to the decoding scheme searched for, and of carrying out playback based on the decoding scheme that performs the decoding normally.

A decoding/playback method of compressed coded data in a compressed coded data playback apparatus in accordance with the present invention includes in the compressed coded data playback apparatus: a step of obtaining input information designating a decoding scheme from outside; a step of decoding the compressed coded data recorded on the recording medium in accordance with the decoding scheme input; a step of searching for another compatible decoding scheme unless the decoding performed in accordance the decoding scheme corresponding to the input information is carried out normally; and a step of trying decoding with successively switching to the decoding scheme searched for, and of carrying out playback based on the decoding scheme that performs the decoding normally.

According to the present invention, the compressed data playback apparatus can be provided which enables playback independently of the compression encoding scheme defined by the identification information like an extension by obtaining the identification information of the compressed coded data recorded on the recording medium or by obtaining the input information designating the decoding scheme from outside; by trying decoding with successively switching to other compatible decoding schemes unless the decoding performed in accordance with the decoding scheme corresponding to the identification information or to the input information obtained is carried out normally; and by carrying out playback based on the decoding scheme that enables normal decoding.

BEST MODE FOR CARRYING OUT THE INVENTION

The best mode for carrying out the invention will now be described with reference to the accompanying drawings to explain the present invention in more detail.

Embodiment 1

Figure 1:
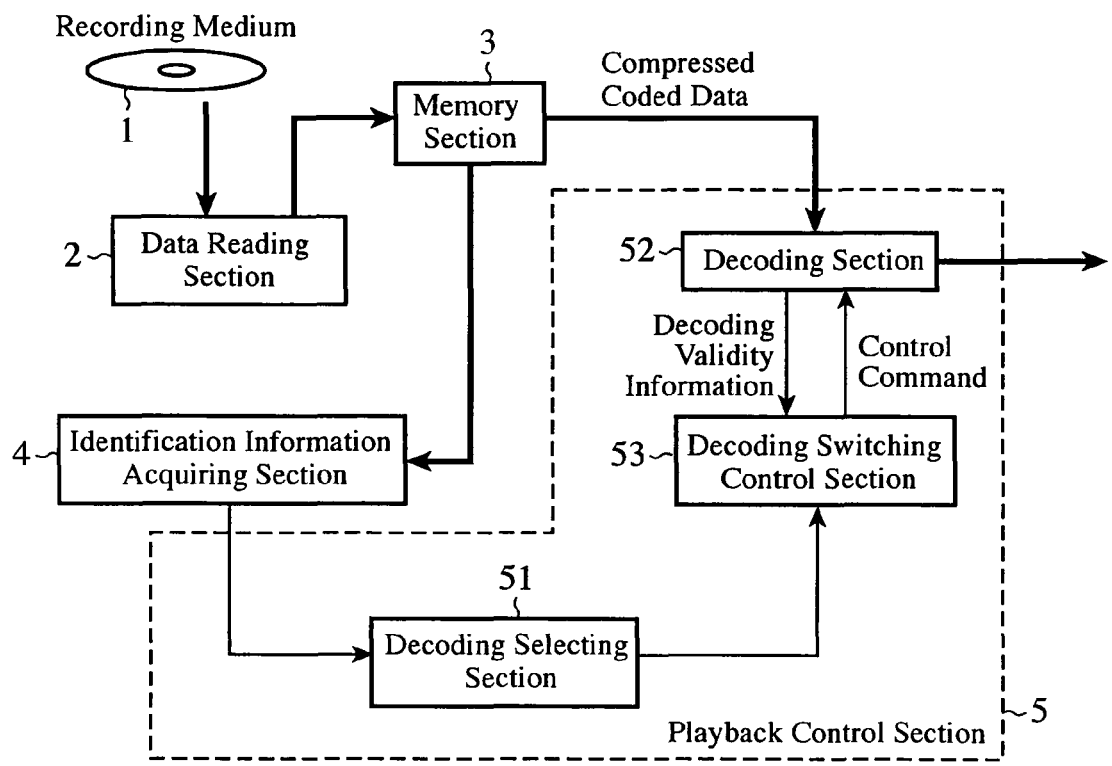
FIG. 1 is a block diagram showing an internal configuration of a compressed coded data playback apparatus of an embodiment 1 in accordance with the present invention.

FIG. 1 is a block diagram showing an internal configuration of a compressed coded data playback apparatus of an embodiment 1 in accordance with the present invention.

The compressed coded data playback apparatus of the embodiment 1 in accordance with the present invention comprises a recording medium 1 mixedly recording media data (called "compressed data" from now on) such as audio or video, which are compressed and recorded in accordance with different compression encoding schemes; a data reading section 2 for reading the recorded compressed coded data from the recording medium 1 via a pickup not shown; a memory section 3 for temporarily retaining the compressed coded data read; an identification information acquiring section 4 for obtaining the identification information (extension) of the compressed coded data recorded on the recording medium 1 via a file system (management region); and a playback control section 5 for carrying out playback by successively switching to other compatible decoding schemes when decoding performed in accordance with the decoding scheme corresponding to the extension results in failure.

The playback control section 5 comprises a decoding selecting section 51 for selecting a compatible decoding scheme in accordance with the extension acquired via the identification information acquiring section 4; a decoding section 52 for decoding the compressed coded data recorded on the recording medium 1 in accordance with the decoding scheme selected by the decoding selecting section 51; and a decoding switching control section 53 for successively switching the compatible decoding schemes in accordance with the validity of the decoding by the is decoding section 52, searches for a decoding scheme capable of playback, and outputs it to the decoding section 52.

Figure 2:
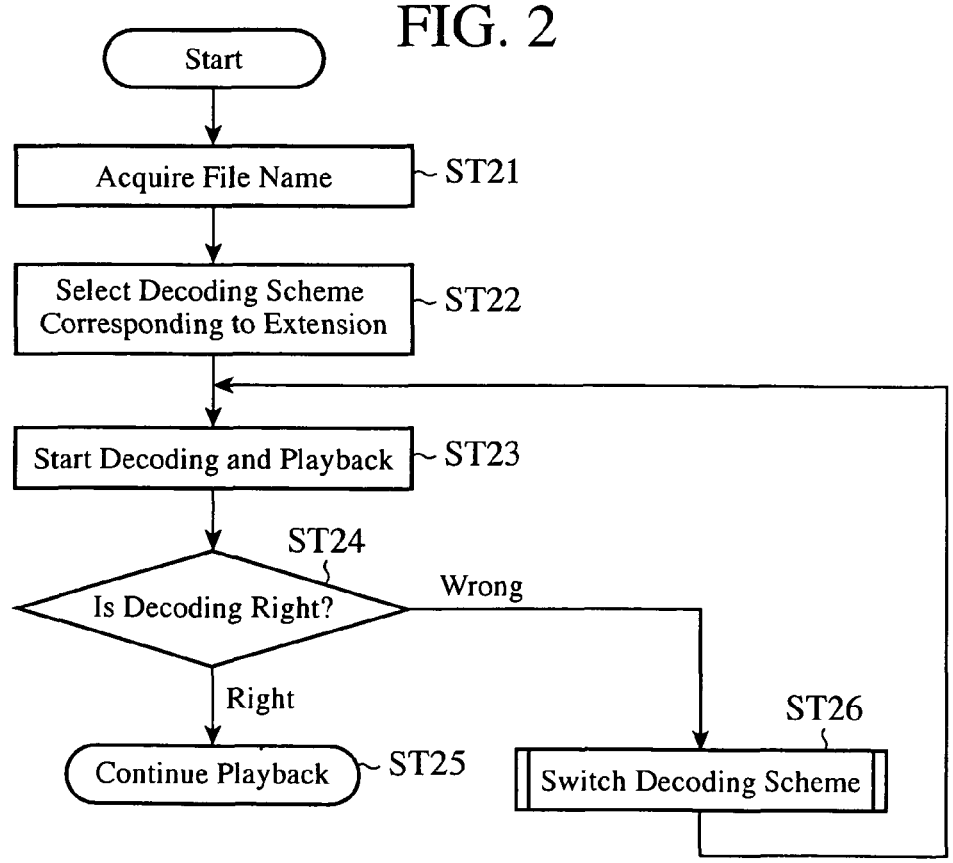
FIG. 2 is a flowchart used for explaining individual steps of a decoding/playback method of the compressed coded data of the embodiment 1 in accordance with the present invention.

FIG. 2 is a flowchart used for explaining individual steps of the decoding/playback method of the compressed coded data of the embodiment 1 in accordance with the present invention.

Referring to the flowchart of FIG. 2, the individual steps of the decoding/playback method of the compressed coded data of the embodiment 1 in accordance with the present invention will now be described below.

In the flowchart of FIG. 2, the identification information acquiring section 4 obtains a file name by referring to a file system recorded in a specific region on the recording medium 1 (step ST21). Thus, the decoding selecting section 51 of the playback control section 5 selects a matching decoding scheme on the basis of the extension the identification information acquiring section 4 obtains (step ST22), and instructs the decoding switching control section 53 on the decoding and playback by the decoding section 52.

It is assumed here that the data reading section 2 has already read the compressed coded data recorded on the recording medium 1, and retains it in the memory section 3. Thus, the decoding section 52 carries out decoding based on a control command designating the decoding scheme output by the decoding switching control section 53, and starts playback (step ST23).

Here, the decoding switching control section 53 acquires the decoding validity information, which is output by the decoding section 52 and indicates whether the decoding is carried out normally or not; makes a go-no-go decision on the decoding (step ST24); and instructs to continue playback (step ST25) or switches the decoding scheme (step ST26). More specifically, the decoding switching control section 53 outputs, when the decoding of the compressed coded data by the decoding section 52 is carried out normally, a control command (to continue playback) to the decoding section 52. In contrast, unless the decoding is carried out normally, it searches for a decoding scheme that will enable playback with successively switching the decoding schemes. Then, repeating the processing from step ST23 and on with trying decoding, it carries out playback in accordance with the decoding scheme that enables normal decoding.

To be concrete, as for an MP3 audio file provided with the extension "WMA", the playback control section 5 carries out decoding based on the decoding scheme of the "WMA" audio, first. Then, unless the decoding is carried out correctly, it switches to the decoding scheme of the MP3 audio, and tries decoding using the decoding scheme of the MP3 audio. If it succeeds in decoding, it performs playback using the decoding scheme of the MP3 audio. If the decoding results in failure, the playback control section 5 tries decoding using another decoding scheme prepared, and repeats the foregoing operation.

According to the foregoing embodiment 1 in accordance with the present invention, even the compressed coded data, which cannot be restored in accordance with the decoding scheme selected first by the decoding selecting section 51, can be played back finally by the operation of the decoding switching control section 53 that searches for the encoding scheme enabling playback, and by the operation of the decoding section 52 that repeatedly tries decoding in accordance with the decoding scheme searched for. This makes it possible to offer a compressed data playback apparatus that enables playback independently of the compression encoding scheme defined by the extension or the like.

Although a configuration is described here which supplies the compressed coded data read by the data reading section 2 to the decoding section 52 via the memory section 3, a configuration is also possible which supplies the compressed coded data read by the data reading section 2 directly to the decoding section 52 without passing through the memory section 3. In this case, however, a path for reading the file system is required separately.

Embodiment 2

Figure 3:
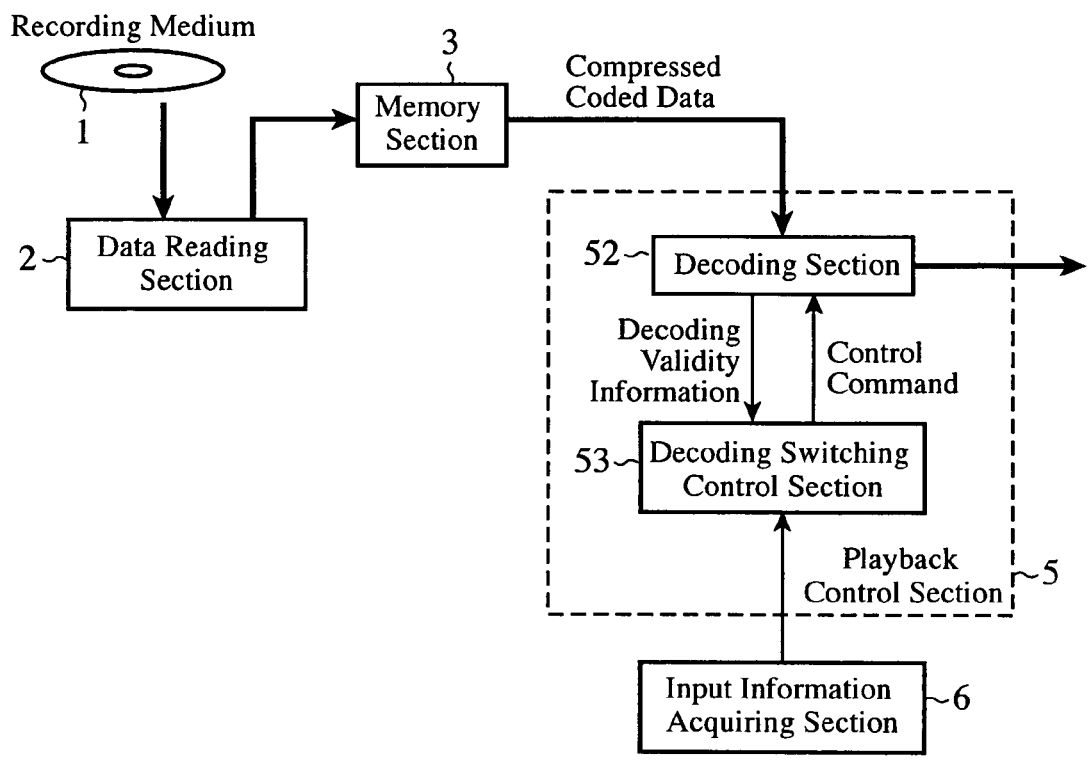
FIG. 3 is a block diagram showing an internal configuration of a compressed coded data playback apparatus of an embodiment 2 in accordance with the present invention.

FIG. 3 is a block diagram showing an internal configuration of the compressed coded data playback apparatus of an embodiment 2 in accordance with the present invention.

In FIG. 3, the present embodiment 2 differs from the embodiment 1 shown in FIG. 1 in that it substitutes an input information acquiring section 6 for the identification information acquiring section 4 that obtains the extension from the file system. The input information acquiring section 6 obtains input information designating a decoding scheme, which is manually input by a user, and supplies it directly to the decoding switching control section 53 of the playback control section 5. Thus, it necessarily follow that the present embodiment 2 can eliminate the need for the decoding selecting section 51 for selecting the compatible decoding scheme in accordance with the identification information acquired, which is required in the playback control section 5 in the embodiment 1.

Figure 4:
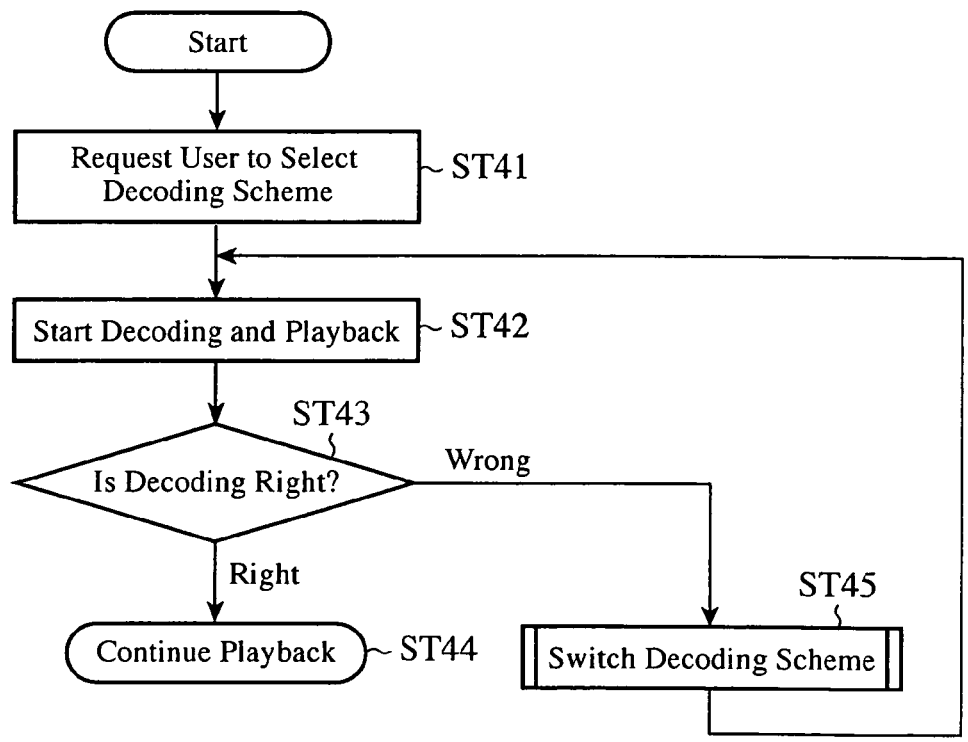
FIG. 4 is a flowchart used for explaining individual steps of a decoding/playback method of the compressed coded data of the embodiment 2 in accordance with the present invention.

FIG. 4 is a flowchart used for explaining individual steps of the decoding/playback method of the compressed coded data of the embodiment 2 in accordance with the present invention.

Referring to the flowchart of FIG. 4, the individual steps of the decoding/playback method of the compressed coded data of the embodiment 2 in accordance with the present invention shown in FIG. 3 will be described below.

In the flowchart of FIG. 4, the input information acquiring section 6 obtains the information that is set and input by the user to indicate the decoding scheme, and supplies it to the decoding switching control section 53 of the playback control section 5 (step ST41). Thus, the decoding switching control section 53 issues to the decoding section 52 a control command to carry out decoding based on the selecting information designating the decoding scheme acquired by the input information acquiring section 6. It is assumed here that the data reading section 2 has already read the compressed coded data recorded on the recording medium 1, and retains it in the memory section 3.

The decoding section 52 carries out decoding based on the control command designating the decoding scheme output by the decoding switching control section 53, and starts playback (step ST23).

Here, the decoding switching control section 53 acquires the decoding information which is output by the decoding section 52 to indicate whether the decoding is right or wrong; makes ago-no-go decision on the decoding in accordance with the decoding information (step ST43); and instructs to continue playback (step ST44) or switches the decoding scheme (step ST45). More specifically, the decoding switching control section 53 outputs, when the decoding of the compressed coded data by the decoding section 52 is carried out normally, a control command (to continue playback) to the decoding section 52. In contrast, unless the decoding is carried out normally, it searches for a decoding scheme that will enable playback with successively switching the decoding schemes. Then, repeating the processing from step ST43 and on with trying decoding, it carries out playback in accordance with the decoding scheme that enables normal decoding.

According to the foregoing embodiment 2 in accordance with the present invention, even the compressed coded data, which cannot be restored by the decoding scheme selected first via the input information acquiring section 6, can be played back finally by the operation of the decoding switching control section 53 that searches for the encoding scheme enabling playback and by the operation of the decoding section 52 that repeatedly tries decoding in accordance with the decoding scheme searched for. This makes it possible to offer a compressed data playback apparatus that enables playback independently of the compression encoding scheme defined by the input information.

In addition, even if the user selects a decoding scheme by mistake, or switches intentionally, the present embodiment 2 can eliminate the need for input for change, and thus can offer convenience.

Figure 5:
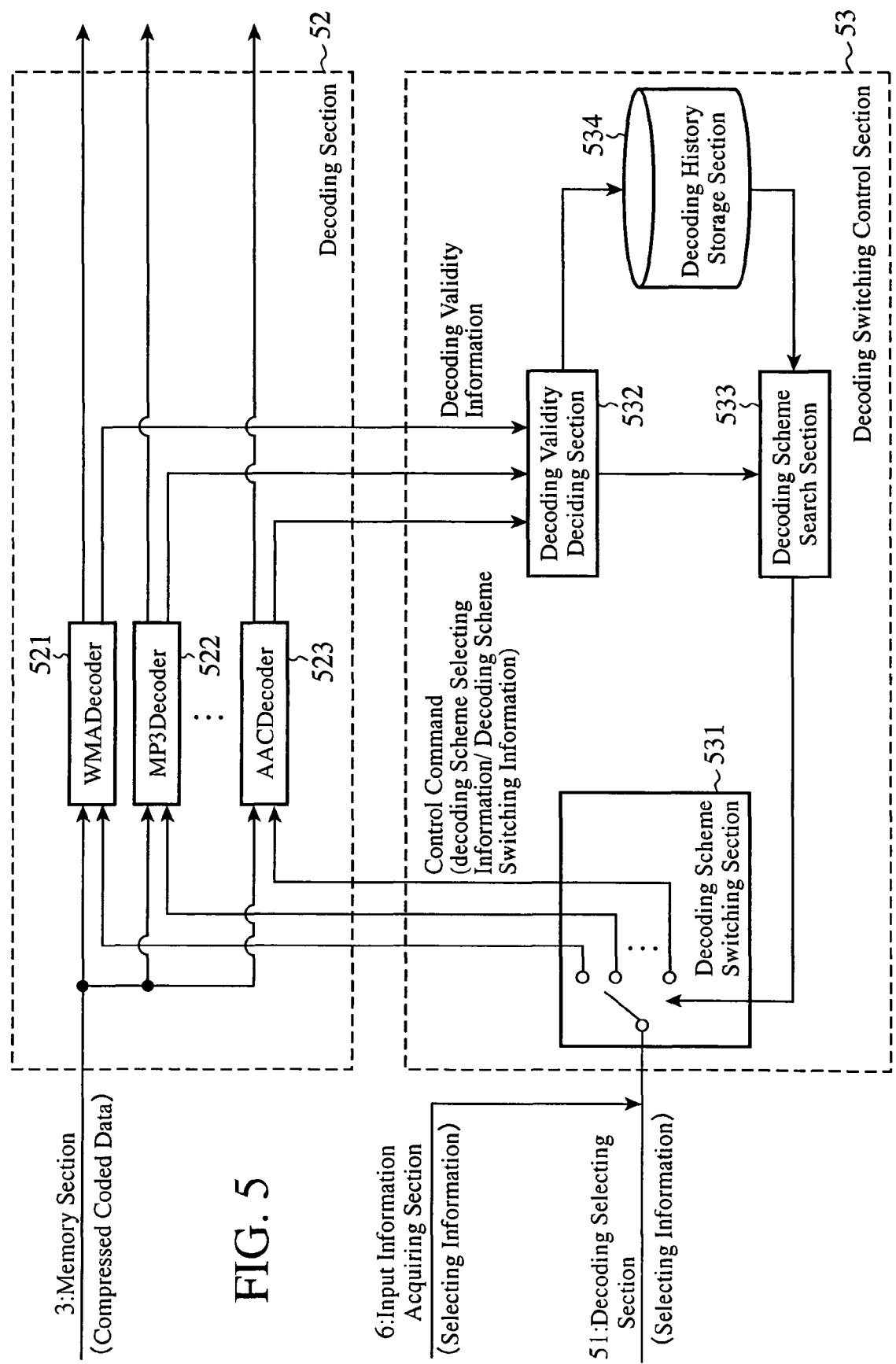
FIG. 5 is a block diagram showing internal configurations of a decoding section 52 and of a decoding switching control section 53 shown in FIG. 1 and FIG. 3.

FIG. 5 is a block diagram showing an internal configuration of the decoding section 52 and decoding switching control section 53 shown in FIG. 1 and FIG. 3.

As shown in FIG. 5, the decoding section 52 includes decoding processing sections having individual decoding schemes prepared in advance for the compression encoding schemes. Here, it is assumed that the decoding section 52 includes a WMA decoder 521, an MP3 decoder 522, and an AAC decoder 523. The WMA decoder 521, MP3 decoder 522, and AAC (Advanced Audio Coding) decoder 523 each acquire as the input the compressed coded data supplied via the memory section 3. Then, one of the decoders is selected in accordance with the decoding scheme selected in response to the control command output by the signal switching section, and the decoder selected outputs a decoding result complying with the decoding scheme the decoder has.

On the other hand, the decoding switching control section 53 comprises a decoding scheme switching section 531, a decoding validity deciding section 532, a decoding scheme search section 533, and a decoding history storage section 534.

The decoding scheme switching section 531 switches the decoding by the decoding section 52 to the decoding scheme selected in accordance with the decoding scheme selecting information output by the decoding selecting section 51 or with the decoding scheme selecting information acquired via the input information acquiring section 6, and starts the decoding section 52 using the control command. The decoding scheme switching section 531 also switches the decoding by the decoding section 52 to the decoding scheme selected in accordance with the decoding scheme switching information output by the decoding scheme search section 533, which will be described below, and starts the decoding section 52 using the control command.

The decoding validity deciding section 532 makes a decision from the decoding validity information output from the decoding section 52 as to whether the decoding is carried out normally or not which is based on the decoding scheme selected in accordance with the decoding scheme selecting information acquired via the decoding selecting section 51 or via the input information acquiring section 6; and depending on the decision result, it starts the decoding scheme search section 533 and stores the decoding history in the decoding history storage section 534. The decoding validity deciding section 532 also makes a decision from the decoding validity information output from the decoding section 52 as to whether the decoding is carried out normally or not which is based on the decoding scheme output from the decoding scheme search section 533; and starts the decoding scheme search section 533 and stores the decoding history in the decoding history storage section 534.

Unless the decoding validity deciding section 532 makes a decision that the decoding based on the decoding scheme selected is carried out normally, the decoding scheme search section 533 searches for another compatible decoding scheme, and outputs the decoding scheme switching information about the decoding scheme obtained to the decoding scheme switching section 531.

The decoding history storage section 534 stores decoding history which is generated every time the decoding section 52 carries out the decoding such as information about accumulated time of decoding of each of the decoders 521, 522 and 523 prepared in advance in the decoding section 52. The decoding scheme search section 533 refers to the decoding history stored in the decoding history storage section 534, and searches for and outputs the decoding scheme with giving first priority to the longest accumulated time of decoding.

Figure 6:
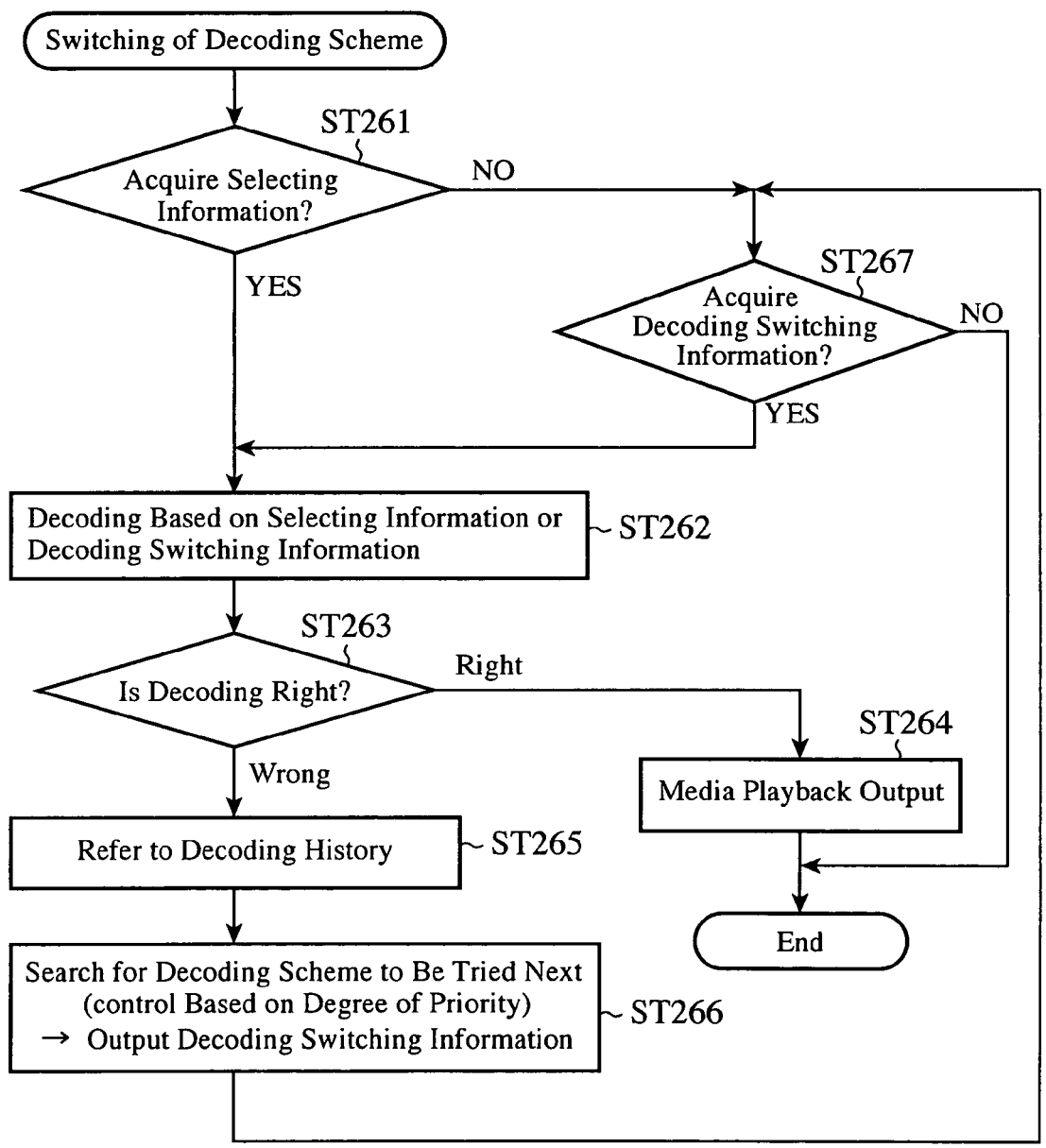
FIG. 6 is a flowchart used for explaining switching operation of the decoding scheme by the decoding switching control section 53 shown in FIG. 5.

FIG. 6 is a flowchart used for explaining the switching operation of the decoding scheme by the decoding switching control section 53 shown in FIG. 5.

Referring to the flowchart shown in FIG. 6, the operation of the decoding switching control section 53 shown in FIG. 5 will be described in detail.

First, when the decoding switching control section 53 acquires by the decoding scheme switching section 531 the decoding scheme selecting information fed via the decoding selecting section 51 or via the input information acquiring section 6 (step ST261), it supplies the decoding scheme selecting information to the decoding section 52 as the control command to instruct the decoding section 52 to carry out decoding based on the decoding scheme selecting information.

In accordance with the control command output from the decoding scheme switching section 531, the decoding section 52 selects one of the decoders 521-523 prepared in advance considering compatibility, and carries out decoding with the decoder selected (step ST262). Here, the decoding information generated by decoding is output to the playback system composed of a D/A (Digital/Analog) converter not shown. In addition, the decoding validity information is output to the decoding switching control section 53.

In the decoding switching control section 53, the decoding validity deciding section 532 makes a decision as to whether the decoding is carried out normally or not on the basis of the signal validity information (step ST263). If the decoding is performed normally ("right" at step ST263), the playback system carries out the playback of the audio and/or video media on the basis of the decoding information (step ST264).

In contrast, unless the decoding is performed normally ("wrong" at step ST263), the decoding scheme search section 533 refers to the decoding history about the accumulated time of decoding of each of the decoders 521-523 prepared in advance and the like, which is stored in the decoding history storage section 534 (step ST265); and selects the decoding scheme with long accumulated time of decoding preferentially, for example, to find the decoding scheme to be tried next, and supplies it to the decoding scheme switching section 531 as the decoding scheme switching information (step ST266).

It is assumed here that the decoding history storage section 534 stores the decoding history about the accumulated time of decoding and the like of each of the decoders 521, 522 and 523 prepared in advance, which is generated every time the decoding section 52 carries out the decoding.

Subsequently, the decoding scheme switching section 531 supplies the decoding section 52 with the control command (decoding switching information) to carry out the decoding on the basis of the decoding scheme output by the decoding scheme search section 533. In response to the control command ("YES" at step ST267), the decoding section 52 selects one of the decoders 521-523 having a matching decoding scheme; repeats the decoding by the decoding section 52 (step ST262) and the search for the next decoding scheme to be used for decoding by the decoding scheme search section 533 (step ST266); and finally selects the decoding scheme which will enable normal decoding to carry out media playback (step ST264).

As described above, even if the decoding scheme selected first cannot achieve the playback, the playback becomes possible by searching for the decoding scheme that enables playback with successively switching the decoding schemes and trying decoding.

As described above, the present invention provides a compressed data playback apparatus capable of achieving playback independently of the compression encoding scheme defined by the identification information or the like by obtaining the identification information (extension) of the compressed coded data recorded on the recording medium 1 or by obtaining the input information designating the decoding scheme from the outside; by trying decoding with successively switching to other compatible decoding schemes when the decoding based on the identification information acquired or on the decoding scheme corresponding to the input information is not carried out normally; and by carrying out playback in accordance with the decoding scheme that enables normal decoding.

Incidentally, the present invention offers particularly marked advantages when applied to the playback of a recording medium that records the compressed coded data with different compression encoding schemes mixedly.

Although the foregoing embodiments 1 and 2 in accordance with the present invention describe only the WMA and MP3 compressed audio data as the compressing coded data, they are not only applicable to ATRAC (Adaptive Transform Acoustic), but also to compressed video data based on MPEG1 (Moving Picture Expert Group 1), MPEG2 (Moving Picture Expert Group 2), MPEG4 (Moving Picture Expert Group 4), WMV (Windows Media Video) (Windows is a registered trademark), or AVI (Audio Video Interleaving) in the same manner.

INDUSTRIAL APPLICABILITY

As described above, the compressed coded data playback apparatus and the compressed coded data playback method in accordance with the present invention, which enables the playback independently of the identification information such as the extension of the file and the like, is suitably applied to multimedia compressed data playback equipment and the like for playing back the audio and/or video recorded on a recording medium such as a CD (Compact Disc), DVD (Digital Versatile Disc), and HD (Hard Disc).

What is claimed is:

1. A compressed coded data playback apparatus which reads compressed coded data recorded on a recording medium and plays back said read data, comprising:
   an identification information acquiring section configured to acquire identification information of the compressed coded data recorded on the recording medium by referring to a management region of the recording medium; and a playback control section configured to attempt decoding the compressed coded data, when failing to normally decode the compressed coded data in accordance with a decoding scheme corresponding to the identification information, by successively switching to other decoding schemes, and configured to play back the compressed coded data in accordance with a switched-to decoding scheme, which has enabled the compressed coded data to be normally decoded as a result of the attempt of decoding, wherein said playback control section comprises:

a decoding selecting section configured to select a decoding scheme in accordance with the acquired identification information;

a decoding section configured to decode the compressed coded data recorded on the recording medium in accordance with the decoding scheme selected by said decoding selecting section, and to make a decision as to whether or not the decoding performed by said decoding section was carried out normally; and a decoding switching control section configured to successively switch decoding schemes utilized in the decoding section to decode said compressed coded data when the decoding of said compressed coded data performed by said decoding section using previous decoding schemes have been decided by the control section not to be normally done.

2. The compressed coded data playback apparatus according to claim 1, wherein the decoding switching control section stores information on decoding history into a decoding history storage section every time said decoding section carries out decoding, and searches for a decoding scheme to be switched to for the attempted decoding, the stored information indicating whether the decoding performed by the decoding section was normally done.

3. A compressed coded data playback apparatus which reads compressed coded data recorded on a recording medium and plays back said read data, comprising:

an input information acquiring section configured to acquire, from outside of the compressed coded data playback apparatus, input information designating a decoding scheme; and a playback control section configured to attempt decoding the compressed coded data, when failing to normally decode the compressed coded data in accordance with a decoding scheme corresponding to the acquired input information, by successively switching to other decoding schemes, and configured to play back the compressed coded data in accordance with a switched-to decoding scheme, which has enabled the compressed coded data to be normally decoded as a result of the attempt of decoding, wherein said playback control section comprises:

a decoding section configured to decode the compressed coded data recorded on the recording medium in accordance with the decoding scheme based on the acquired input information, and to make a decision as to whether or not the decoding performed by said decoding section was carried out normally; and a decoding switching control section configured to successively switch decoding schemes utilized in the decoding section to decode said compressed coded data when the decoding of said compressed coded data performed by said decoding section using previous coding schemes have been decided by the control section not to be normally done.

4. The compressed coded data playback apparatus according to claim 3, wherein the decoding switching control section stores information on decoding history into a decoding history storage section every time said decoding section carries out decoding, and searches for a decoding scheme to be switched to for the attempted decoding, the stored information indicating whether the decoding performed by the decoding section was normally done.

5. A decoding/playback method of compressed coded data, said method being implemented by an apparatus which reads compressed coded data recorded on a recording medium and plays back said read data, and said method comprising steps of:

acquiring identification information of the compressed coded data recorded on the recording medium by referring to a management region of the recording medium;

selecting a decoding scheme corresponding to the acquired identification information;

decoding the compressed coded data recorded on the recording medium in accordance with the selected decoding scheme;

attempting decoding the compressed coded data, when failing to normally decode the compressed coded data in accordance with the selected decoding scheme, by successively switching to other decoding schemes; and playing back the compressed coded data in accordance with a switched-to decoding scheme, which has enabled the compressed coded data to be normally decoded as a result of the attempt of decoding, wherein the compressed coded data recorded on the recording medium is decoded in accordance with the decoding scheme based on the acquired input information, and a decision as to whether or not the decoding performed using said decoding scheme based on the acquired input information was carried out normally; and if the decoding performed in accordance with the decoding scheme based on the acquired input information was decided not to be normally done, decoding schemes that are used to decode the compressed coded data are successively switched when the decoding performed in accordance with the previous decoding schemes have been decided not to be normally done.

6. The decoding/playback method according to claim 5, further comprising:

storing information on decoding history into a storage every time the compressed coded data is decoded in accordance with the selected decoding scheme, the stored information indicating whether said decoding was normally done, and searching a decoding scheme to be switched to for the attempted decoding by using the information stored in the storage.

7. A decoding/playback method of compressed coded data, said method being implemented by an apparatus which reads compressed coded data recorded on a recording medium and plays back said read data, and said method comprising steps of:

acquiring input information designating a decoding scheme from outside of the apparatus;

decoding the compressed coded data recorded on the recording medium in accordance with the decoding scheme designated by the acquired input information;

attempting decoding the compressed coded data, when failing to normally decode the compressed coded data in accordance with the decoding scheme designated by the acquired input information, by successively switching to other decoding schemes; and playing back the compressed coded data in accordance with a switched-to decoding scheme, which has enabled the compressed coded data to be normally decoded as a result of the attempt of decoding, wherein the compressed coded data recorded on the recording medium is decoded in accordance with the decoding scheme based on the acquired input information, and a decision as to whether or not the decoding performed using said decoding scheme based on the acquired input information was carried out normally; and if the decoding performed in accordance with the decoding scheme based on the acquired input information was decided not to be normally done, decoding schemes that are used to decode the compressed coded data are successively switched when the decoding performed in accordance with previous decoding schemes have been decided not to be normally done.

8. The decoding/playback method according to claim 7, further comprising:

storing information on decoding history into a storage every time the compressed coded data is decoded in accordance with the decoding scheme designated by the acquired input information, the stored information indicating whether said decoding was normally done, and searching a decoding scheme to be switched to for the attempted decoding by using the information stored in the storage.

* * * * *